United States Patent [19]

Schwartz

[11] 4,150,614
[45] Apr. 24, 1979

[54] AUTOMATIC ROUND BALE WRAPPING ASSEMBLY

[76] Inventor: Dale R. Schwartz, R.R. No. 2, Hedrick, Iowa 52563

[21] Appl. No.: 882,172

[22] Filed: Feb. 21, 1978

[51] Int. Cl.² .............................................. B65B 13/18
[52] U.S. Cl. ......................................... 100/5; 100/13; 100/88
[58] Field of Search ............................... 100/5, 13, 88

[56] References Cited

U.S. PATENT DOCUMENTS

| 2,336,491 | 12/1943 | Luebben | 100/5 |
| 2,424,821 | 7/1947 | Harrer | 100/5 X |
| 2,850,964 | 9/1958 | Harrer | 100/5 |
| 3,894,484 | 7/1975 | Anstey | 100/5 |
| 3,910,178 | 10/1975 | Eggers | 100/5 |

*Primary Examiner*—Billy J. Wilhite
*Attorney, Agent, or Firm*—Rudolph L. Lowell

[57] ABSTRACT

An automatic bale wrapping assembly for a machine that forms round bales of windrowed crop material and includes a mobile main frame with a bale forming assembly having a bale forming region defined by an upper conveyor and a lower conveyor that feeds the crop material to the bale forming region and rotates the material during and subsequent to bale formation. The bale wrapping assembly has a twine dispensing arm, from which a free end of a twine supply extends, a moveable support for the dispensing arm, a locking mechanism for releasably securing the dispensing arm in a rest position, coacting members on the bale forming assembly and the main frame for automatically actuating the locking mechanism when a bale being formed reaches a predetermined diameter, a spring member for moving the dispensing arm in one direction upon release thereof by the locking mechanism to a bale wrapping position whereat the free twine end is threaded about one end of the bale, a hydraulic motor for moving the dispensing arm in an opposite direction along the formed bale to wrap the twine about the length of the bale, and a cutter assembly for cutting the twine at the completion of the bale wrapping operation.

6 Claims, 18 Drawing Figures

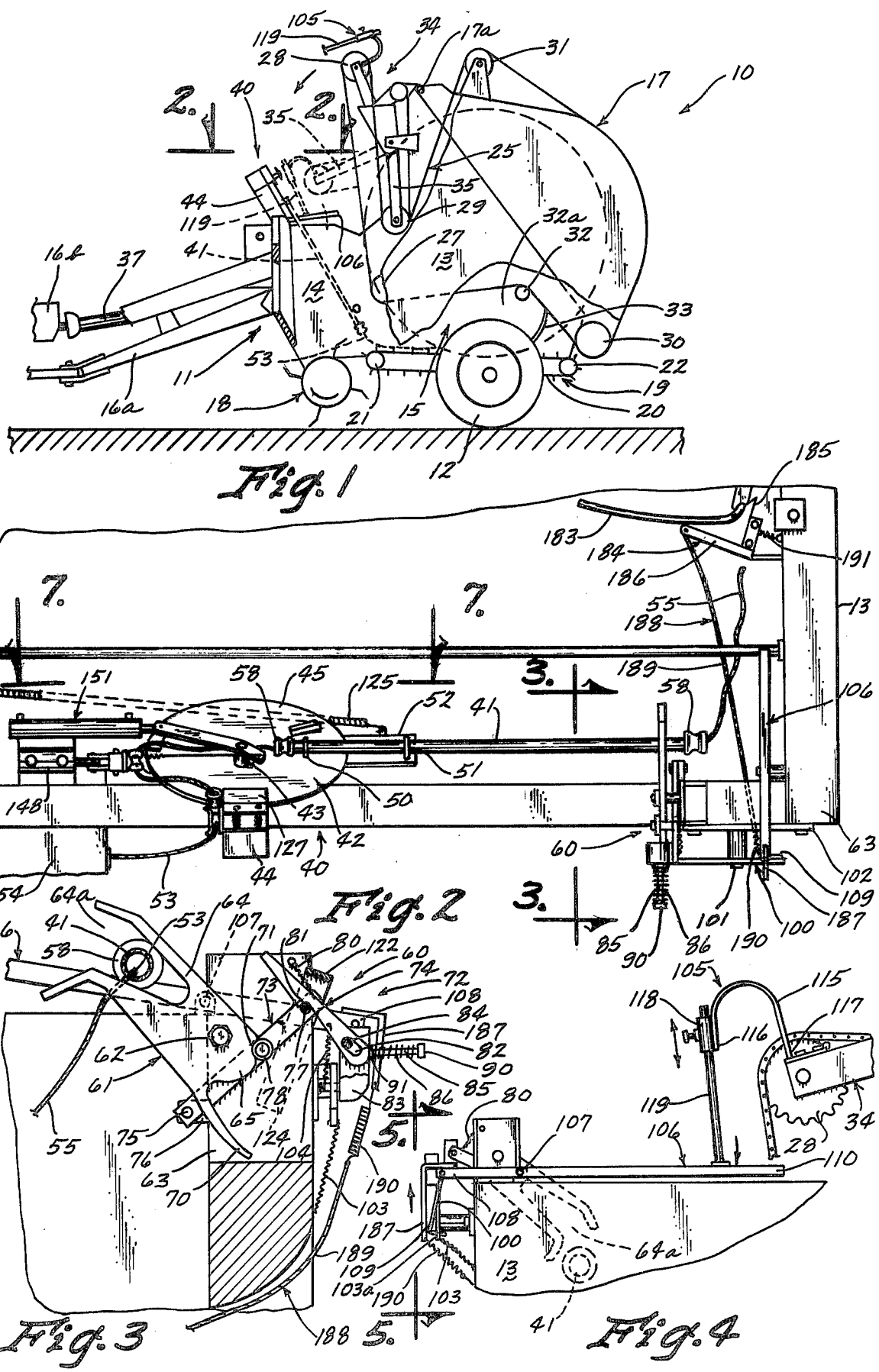

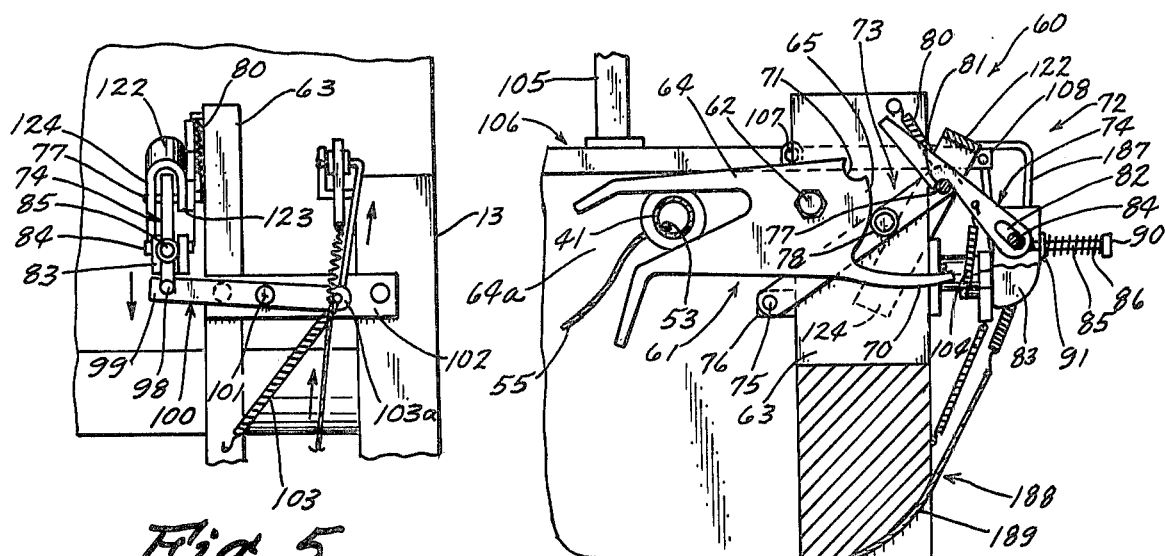
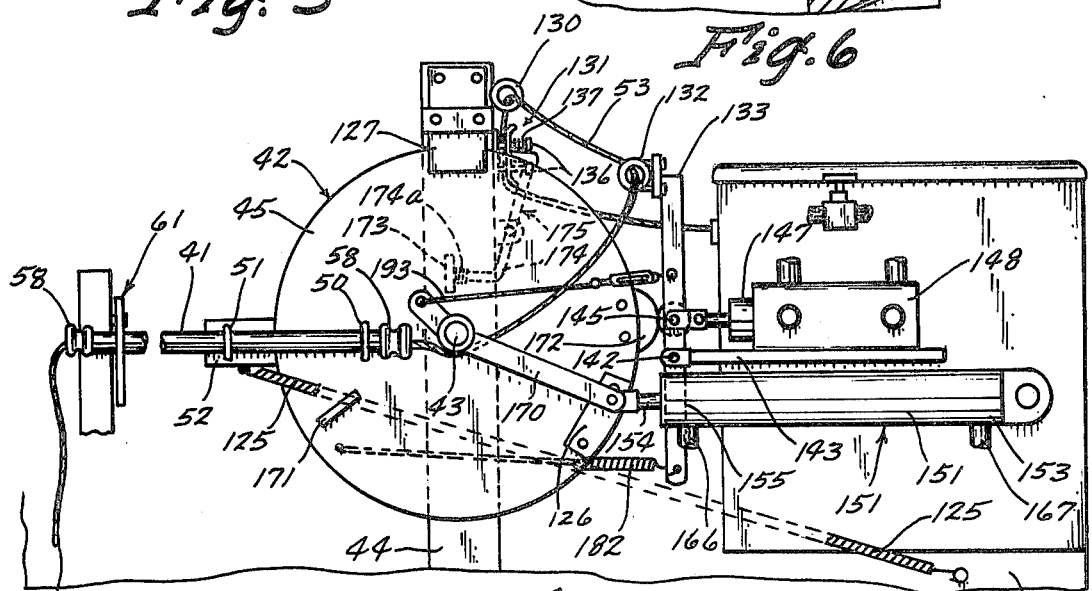
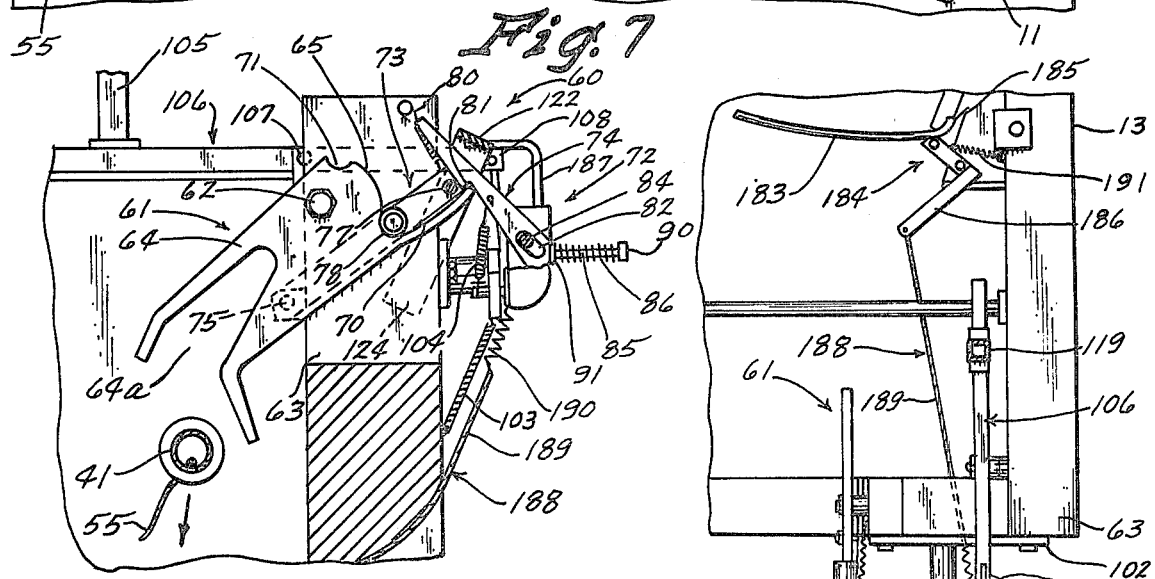

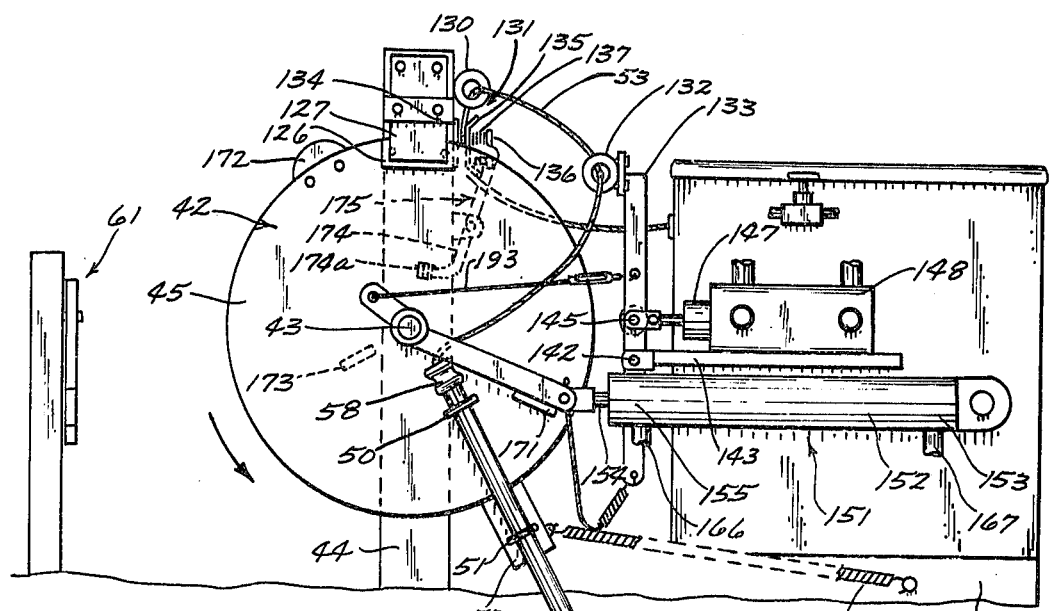
Fig. 10
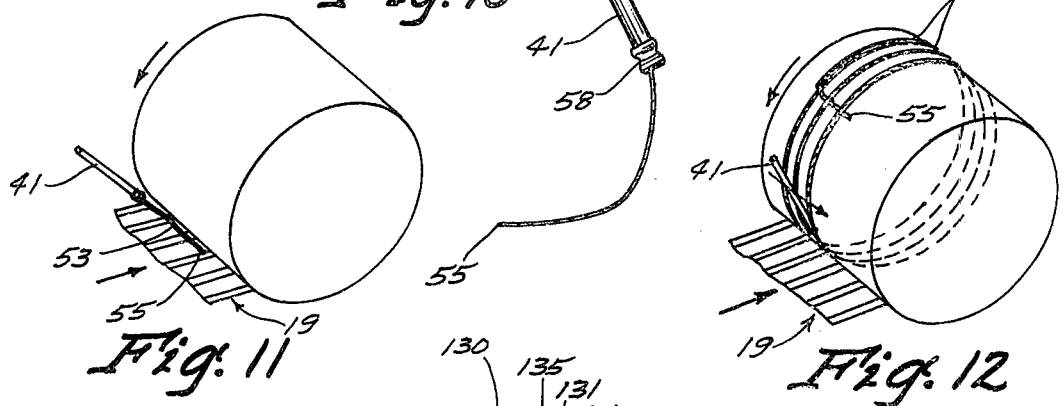
Fig. 11
Fig. 12
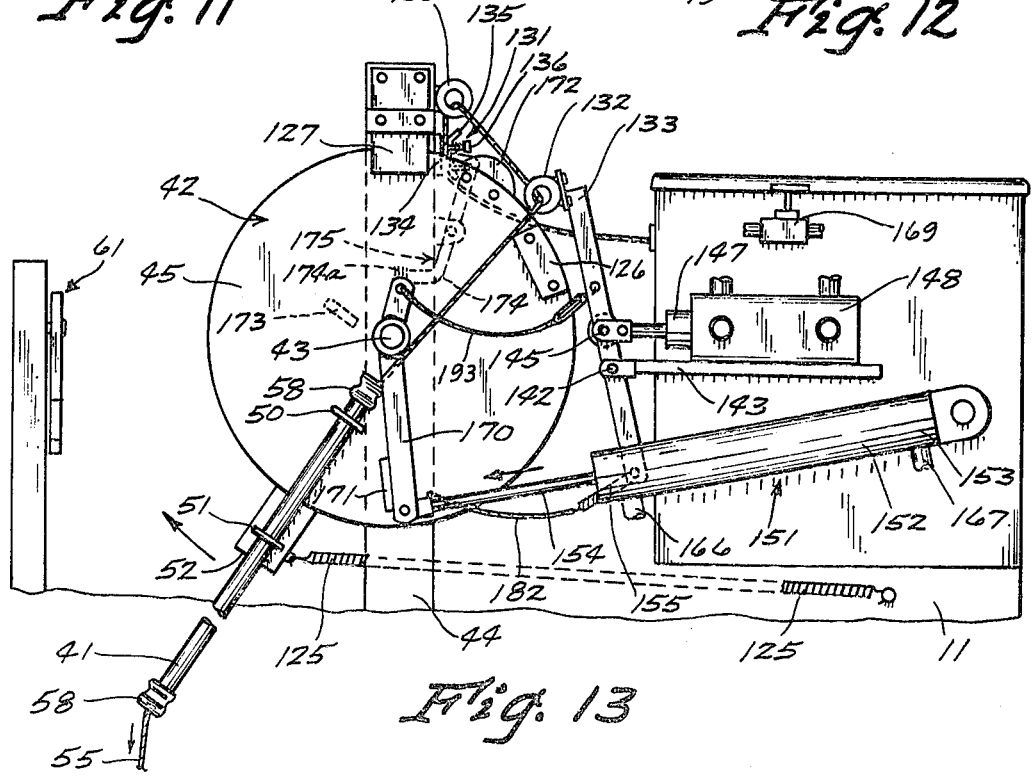
Fig. 13

AUTOMATIC ROUND BALE WRAPPING ASSEMBLY

BACKGROUND OF THE INVENTION

1. Field of the Invention

The present invention relates in general to machines for forming round bales of windrowed material, and more specifically to such machines that have automatic bale wrapping assemblies for wrapping twine about the bales.

2. Description of the Prior Art

Machines for forming cylindrical bales of agriculture crop materials have been known for at least the last decade. However, the use of automatic bale wrapping assemblies with such machines is a recent development. An example of such an assembly is disclosed in two U.S. Pat. Nos. 3,894,484 and 3,913,473. The bale wrapping assembly disclosed in such patents includes a twine dispensing arm that is swung in a generally horizontal arc from one side of a bale being formed to the other side by a hydraulic cylinder so that the twine is wrapped in a spiral about the bale as it is rotated by a conveyor.

Although the above assembly reduces certain of the steps of prior manual bale wrapping processes, it suffers from the deficiencies that it is not automatically actuated and it does not provide a support position for the twine dispensing arm at any time. The only means for securing the dispensing arm in position during non-wrapping operation of the baler is the hydraulic cylinder that powers the dispensing arm during wrapping. The cylinder is the sole support for the dispensing arm but is secured to only one end thereof. Consequently, the dispensing arm appears to be susceptible to damage due to the severe shocks and vibrations that a baler normally encounters during normal operation.

SUMMARY OF THE INVENTION

The present invention provides a round bale forming machine with an improved assembly for automatically wrapping the bales formed by the machine and includes a dispensing arm for dispensing bale wrapping twine, a moveable support for the dispensing arm, a locking means for releasably locking the dispensing arm in a rest position, coacting means for automatically actuating the locking means to release the dispensing arm when a bale being formed reaches a predetermined diameter, means for moving the released dispensing arm from the rest position to a bale wrapping position in which the twine is wrapped about one end of the bale, means for moving the guide along the lower side of the bale to wrap twine along the length of the bale, and cutting means for cutting the twine subsequent to completion of the bale wrapping.

In a preferred embodiment, the means for moving the guide from the rest position to the bale wrapping position is a spring under relatively high tension so that upon release of the dispensing arm by the locking means, the arm is rapidly moved to the bale wrapping position. In contrast to the rapid movement provided by the spring, the means for moving the dispensing arm along the length of the bale during wrapping is a hydraulic motor adapted to provide relatively slow movement of the arm so that the twine is wrapped about the bale a sufficient number of wraps to insure that the bale will be securely held together.

BRIEF DESCRIPTION OF THE DRAWINGS

FIG. 1 is a diagrammatical side view of a baling machine on which the bale wrapping assembly of the present invention is employed;

FIG. 2 is an enlarged view taken on line 2—2 of FIG. 1, showing the bale wrapping assembly of the present invention mounted on the main frame of the baler, with a twine dispensing arm of the assembly in a locked position;

FIG. 3 is an enlarged view taken on line 3—3 in FIG. 2 showing the end of the twine dispensing arm secured in place by a holder of a locking mechanism;

FIG. 4 is a fragmentary side view of the bale wrapping assembly showing coacting members for automatically actuating a bale wrapping operation and with the holder of the locking mechanism rotated to release the dispensing arm;

FIG. 5 is a fragmentary enlarged view taken on line 5—5 in FIG. 4, showing the rear of the locking mechanism and the linkage between the coacting members and the locking mechanism;

FIG. 6 is similar to FIG. 3, but showing the holder of the locking mechanism rotating to release the dispensing arm;

FIG. 7 is an enlarged view taken on line 7—7 in FIG. 2;

FIG. 8 is similar to FIG. 6, but showing the holder rotated sufficiently to completely release the dispensing arm from the locking mechanism;

FIG. 9 is a fragmentary plan view of the locking mechanism, the coacting members and a twine gate closing off a twine cutting area;

FIG. 10 is similar to FIG. 7 but showing the dispensing arm in a starting position of bale wrapping and with a free end of twine extended therefrom;

FIG. 11 is a diagrammatical view showing twine from the dispensing arm being engaged with a bale formed by the machine.

FIG. 12 is a diagrammatical view showing the twine being wrapped about the bale;

FIG. 13 is a view similar to FIG. 10, but showing the twine dispensing arm being rotated by a hydraulic motor to provide the twine wrapping shown in FIG. 12;

DESCRIPTION OF THE PREFERRED EMBODIMENT

Figure 14:
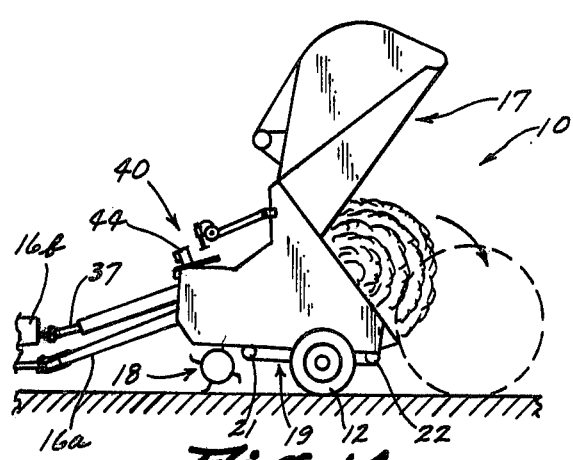
FIG. 14 is a diagrammatical view showing ejection of a formed and wrapped bale from the rear of the baler.

A preferred embodiment of the bale wrapping assembly of the present invention is incorporated in a bale forming machine indicated generally at 10 in FIG. 1 for forming large cylindrical bales of hay or other fibrous materials. The machine 10 is similar to Sperry New Holland's round baler Model 850 and includes a main frame 11 mounted on a pair of wheels 12. The main frame 11 includes a pair of upright spaced apart sidewalls 13 and 14 defining a baling chamber 15 therebetween. A transverse lower beam (not shown) connects the lower forward ends of the sidewalls 13 and 14 and a tongue 16a extends forwardly from the middle of the transverse beam for connecting the baler to a tractor or the like (not shown) having a conventional rear power take-off mechanism 16b. The main frame 11 also includes a transverse upper beam (not shown) interconnecting the upper front portions of the sidewalls 13 and 14. A rear gate assembly indicated generally by the numeral 17 is pivoted to the main frame 11 at 17a.

A pickup mechanism 18, which is of conventional construction is mounted for vertical adjustment on the main frame 11. The mechanism 18 spans the width of the frame 11 forwardly of the baling chamber 15 to elevate the crop from the field as the machine 10 advances and deliver it rearwardly onto a belt type conveyor 19 that serves as a lower portion of a bale forming means. The conveyor 19 spans the width of the machine 10 between the sidewalls 13 and 14 and includes an endless belt 20 that is trained around a front roller 21 and a driven rear roller 22 such that the upper run of the conveyor 19 is substantially horizontal.

An upper conveyor 25 is disposed between the opposite sidewalls 13 and 14 above the lower conveyor 19 to serve as an upper portion of the bale forming means. The specific members of the conveyor 25 are not shown but include a plurality of transverse bars that are fastened to a pair of chains in a parallel, spaced apart relation. The chains are trained around lower and upper front sprockets 27 and 28 respectively, upper intermediate sprockets 29, lower and upper rear sprockets 30 and 31, respectively and core forming can idlers 32 interposed between the sprockets 27 and 30.

At the initiation of the bale forming operation, the lower rear sprockets 30 are disposed above and slightly to the back of the rear lower conveyor roller 22, and the upper conveyor 25 is inclined upwardly and forwardly from the sprockets 30 to form a baling zone 32a between the upper and lower conveyors 25 and 19 respectively. As the crop material is delivered in a mat on top of the upper run of the lower conveyor 19, it moves rearwardly until it engages curved leaf springs 33 adjacent the conveyor 19 which cause the mat of crop material to start to roll and form a bale.

As the bale grows, the portion of the upper conveyor 25 between the lower rear sprockets 30 and the lower front sprockets 27 must be increased, and a conveyor take-up mechanism of the bale forming means, indicated generally by the numeral 34, is provided to supply the necessary length. The take-up mechanism 34 includes a pair of arms 35, (only one of which is shown) adjacent each sidewall 13 and 14 and extended upwardly from a pivoted connection 36. As the bale grows, the arms 35 swing counterclockwise to permit the portion of the conveyor 25 in the baling zone 32a to expand until the bale is fully formed. Springs (not shown) supply an increasing tension on the conveyor 25 as the bale grows, compressing the hay into the bale as it is rolled by the lower conveyor.

The upper run of the lower conveyor 19 moves rearwardly while the lower run of the upper conveyor 25 moves forwardly. The conveyors 25 and 19, and the pickup mechanism 24 are all driven by conventional belt drives that are powered through a driveshaft 37 above the implement tongue 16a, with the forward end of the driveshaft 37 being connectible to the tractor power take-off 16b in conventional manner.

A bale wrapping assembly, indicated generally by the numeral 40, is mounted on the main frame 11 above the pickup mechanism 18 for feeding a length of twine from a twine supply to the baling region and is automatically actuated after a bale is fully formed. During such supply of twine, the bale is continuously rotated while the twine is fed rearwardly to the baling chamber causing the twine to wind around the exterior of the bale.

Referring now to FIGS. 1 and 2, the bale wrapping assembly 40 includes an elongate, twine dispensing arm 41 mounted on a disk shaped control wheel 42. The wheel 42 is journaled on an axle 43 fixed to a support strut 44 (FIG. 1) extended forwardly and upwardly from the upper front portion of the main frame 11 so that an upper surface 45 of the wheel 42 faces on an incline toward the baling chamber. The dispensing arm 41 is tightly secured to the control wheel 42 by an inner bracket 50 (FIG. 2) and an outer bracket 51 attached to a support plate 52 extended from a peripheral portion of the wheel 42 so that there is no relative movement between the arm 41 and wheel 42. The dispensing arm 41 is tubular to permit threading therethrough of twine 53 from a twine supply 54, with a free end 55 of the twine 53 extended from the outer end of the dispensing arm 41. Guides 58 are attached to the ends of the arm 41 to aid in smooth travel of the twine 53 through the arm as it is dispensed.

At all times except during bale wrapping operation of the assembly 40, the dispensing arm 41 is held in a rest position by a locking mechanism, shown generally at 60 in FIG. 2, to the right of the control wheel 42. Referring now to FIG. 3, the locking mechanism 60 includes a dispensing arm holder 61 spaced from and pivoted at 62 on an upright support strut 63 secured to the sidewall 13 of the main frame 11. The arm holder 61 is biforcated at one end 64 to define a receiving area 64a for the arm 41, and has an opposite end 65 with a curved finger 70 extended outwardly at its lower portion and a notch 71 at its upper portion. A latch release mechanism 72 has a pawl release lever 73 and a pawl 74 and serves to control pivoting action of the guide holder.

The pawl release lever 73 is positioned between the support strut 63 and the arm holder 61, with a lower end pinned at 75 to an ear 76 protruding from strut 63. The release lever 73 has a pin 77 at its upper end and a roller 78 mounted intermediate its length to engage the notch 71 in the holder 61. A spring 80 is connected to the upper end of the release lever 73 and the upper end of the strut 63 to place a counterclockwise bias force on the lever 73. While the locking mechanism 60 holds the dispensing arm 41 in its rest position, counterclockwise movement of the lever 73 is prevented by the pawl 74 that has a catch portion 81 engaging the lever pin 77. The lower end of the pawl 74 has a slot 82 and is secured in a U-shaped connector 83 (FIG. 5) by a pin 84 positioned through the slot 82 and fastened to the sides of the connector 83. One end of a horizontally aligned unthreaded bolt 85 (FIG. 3) is fixed to the lower end of the pawl 74, and carries a spring 86 positioned between a head 90 at one end of the bolt 85 and a slidable washer 91 that abuts against the outer edges of the connector 83. The tension of the spring 86 limits pivotal movement of the pawl 74.

Referring again to FIG. 5, the connector 83 is bolted at 98 on one end 99 of a lever arm 100 pivotally mounted at 101 on a support plate 102 secured to the strut 63 and the sidewall 13 of the frame 11. A spring 103 is connected to an opposite end 103a of the lever arm 100 and the strut 63 to bias the lever 100 in a clockwise direction. Also, a spring 104 (FIG. 8) is connected to the pawl 74 and the bolt connection 98 of the lever arm 100 and the connector 83. In this way, the pawl 74 is biased with a downwardly directed force to maintain it in engagement with the lever pin 78 and thereby restrict counterclockwise movement of the upper end of the pawl release lever 73.

Referring again to FIG. 1, the bale wrapping assembly 40 includes two coacting actuating members 105 and 106 adapted to automatically initiate a bale wrapping operation when a bale being formed by the machine 10 reaches a predetermined diameter. The actuating member 106 is elongated and is pinned at 107 (FIG. 4) to the sidewall 13 of the frame 11. One end 108 of the member 106 terminates above the lever arm 100 and is connected thereto by a link 109. The opposite end 110 of the member 106 is extended toward the baling zone 32a due to the bias action of the spring 103 on the lever 100.

The member 105 is formed of a curved bracket 115 having a free end 116 and an end 117 fixed to the tension pivot arm 34 associated with the main frame sidewall 13. Accordingly, the bracket 115 moves in conjunction with pivotal movement of the arm 34 during bale formation, as previously described. A clamp 118 is welded to the bracket free end 116 for adjustably receiving an extension arm 119.

Upon initiation of a bale forming operation, the extension arm 119 is slightly inclined to a horizontal plane (FIG. 1). As the bale grows and the pivot arms 34 swing counterclockwise, the extension arm 119 is moved into substantially a vertical alignment (FIG. 4) engaging the end 110 of the actuating member 106 and pivoting the member 106 in a clockwise direction. Accordingly, the end 108 of the actuating member 106 is rotated upwardly and in turn produces similar movement of the end 103a of the lever arm 100 connected to the member 106 by the link 109. Consequently, the end 99 of the lever arm 100 bolted to the connector 83 is pivoted in a downward direction, as is the connector 83.

Due to the slot 82 in the pawl 74, initial downward movement of the connector 83 does not cause significant movement of the pawl 74 and is merely lost motion. However, when the end of the lost motion is reached, the pawl 74 is moved downwardly (FIG. 6), which compresses the spring 86 and rotates the lever roller 71 out of the notch 78 in the dispensing arm holder 61. As a result, the holder 61 begins rotating in a counterclockwise direction, as indicated by FIG. 6, wherein the twine dispensing arm 41 is about to be released from the holder 61, and FIG. 8, wherein release of the dispensing arm 41 by the holder 61 has occurred.

It should be noted that as the holder 61 pivots counterclockwise, the end of the holder finger 70 engages the pawl 74 and forces it to rotate clockwise sufficiently that the pin 77 of the lever 73 is released from the catch 81 of the pawl 74. At that time, the pawl 74 is pulled downwardly by the spring 86, and the lever 73 is reset to its original position by the spring 80. A finger guide 122 (FIG. 5) that is in the shape of an upside down "J" is saddled on the pawl 74 and includes a short leg 123 on the side of the pawl 74 adjacent the strut 63 and a long leg 124 on the opposite side of the pawl 74. The lever pin 77 is extended through the lever 73 and is fixed at its ends to the finger guide legs 123 and 124 to secure the guide 122 to the pawl 74. In this way the guide 122 serves to insure that proper engagement between the finger 70 and pawl 74 occurs.

As shown in FIG. 7, the dispensing arm 41 is in its rest position, but upon release of the arm 41 by the holder 61, a spring 125 connected to and stretched between the support plate 52 and the main frame 11, causes rapid counterclockwise rotation of the control wheel 42 and arm 41. The amount of such rotation is controlled by a brake plate 126 fixed to a peripheral portion of the control wheel 42. Thus, as the control wheel 42 rotates counterclockwise, the brake plate 126 is engaged by the brake shoe 127 to bring the wheel 42 to a stop position, as indicated in FIG. 10, wherein the dispensing arm 41 has been rotated into a bale wrapping position.

As previously described, the control wheel 42 is mounted on the strut 44 with its upper surface 45 facing toward the baling zone 32a but is slanted in a forward direction. As a result, rotation of the control wheel 42 swings the twine dispensing arm 41 downward from its rest position so that the outer end of the arm 41 is brought adjacent the end of the conveyor 19 near the frame sidewall 14. In such position, the free end 55 of the twine 53 is engaged by the conveyor 19, as shown in FIG. 11, for travel under the lower side and about a first end of a bale being formed in the baling zone 32a as the bale is rotated therein.

Before the twine 53 is supplied to the baling region by passing through the twine dispensing arm 41, it passes through a guide ring 130 (FIG. 10), a twine tension assembly 131 mounted on the strut 44 adjacent the brake shoe 127 and a guide ring 132 secured to one end of a control valve lever arm 133. The twine tension assembly 131 includes a fixed plate 134 attached to the strut 44 and a moveable plate 135 that is slidably carried on bolts 136 threaded in the plate 134. Springs 137 are positioned between the heads of the bolts 136 and the plate 135 to provide an adjustable tension on the twine 53 threaded through the assembly 131.

The valve lever arm 133 is pinned intermediate its length at 142 to a support arm 143 extended from the main frame 11, and is also pivotally secured at 145 to one end of a valve spool 147 for a hydraulic valve 148 mounted on the main frame 11. When the valve 148 is actuated, fluid is supplied to a double acting hydraulic motor 151 that includes a cylinder 152 in which a piston (not shown) is positioned for movement with respect to a blind end 153 of the cylinder 152. A piston rod 154 is fixed to the piston and extends from cylinder rod end 155.

Figure 17:
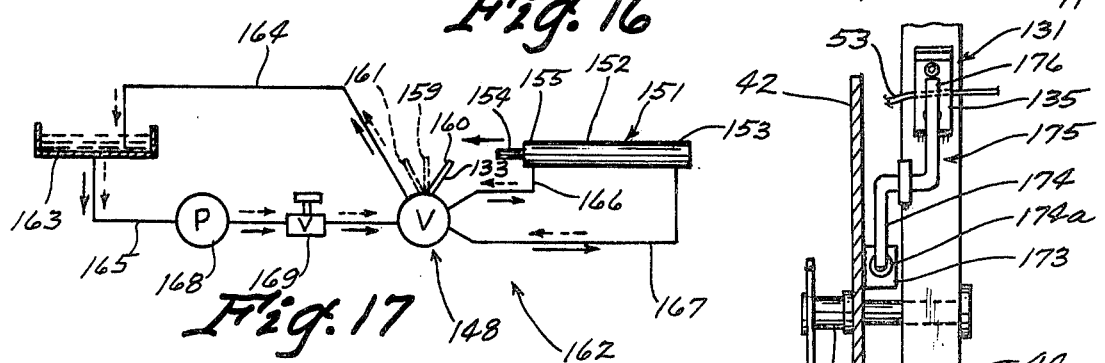
FIG. 17 is a diagrammatical and schematic view of the fluid circuit for the hydraulic motor that returns the dispensing arm back to the locking mechanism.

Referring to FIG. 17, the valve 148 is a typical three position, four way directional control unit that is actuated in response to movement of the valve lever arm 133 from a neutral position 159 to either an extend position 160 or a retract position 161. The valve 148 forms part of a hydraulic circuit 162, that also includes a reservoir 163 connected to one side of the valve 148 by lines 164 and 165 and the hydraulic motor 151 that is connected to the other side of the valve 148 by lines 166 and 167. A unidirectional fluid pump 168 in the line 165 draws fluid from the reservoir 163 and supplies it to the control valve 148 through a metering valve 169 also in the line 165. The metering valve 169 serves to limit the flow of fluid supplied to the control valve 148 to a desired rate.

When the control valve 148 is in the neutral position 159, the lines 164 and 165 are connected together so that fluid flowing in the line 165 returns back to the reservoir 163. When the valve 148 is actuated to the extend position 160, the lines 165 and 167 are connected together to supply fluid to the blind cylinder end 153, and the lines 164 and 166 are connected together to permit fluid from the rod cylinder end 155 to flow to the reservoir 163. When the valve 148 is actuated to the retract position 161, the lines 165 and 166 are connected together for supply of fluid to the rod end 155, and the lines 164 and 167 are connected together to return fluid from the blind end 153 to the reservoir 163.

Initial actuation of the valve 148 during a bale wrapping operation occurs in response to wrapping of twine about the first end of a bale that has been formed, which causes tensioning of the twine 53 passing through the guide ring 132 by the twine tension assembly 131. Initial tension on the twine 53 must be light to permit the twine 53 to be easily grabbed by the bale and also to permit a loose wrap of the twine about the bale, but such tension must be sufficient to cause actuation of the valve 148. As a result, the valve lever arm 133 is pivoted counterclockwise sufficiently to actuate the valve 148 into the rod extending position 160 whereby hydraulic fluid is supplied to the cylinder blind end 153. The outer end of the piston rod 154 is attached to a position control arm 170 that is pivotally mounted on the control wheel axle 43, but is free to move relative to the wheel 42.

Figure 18:
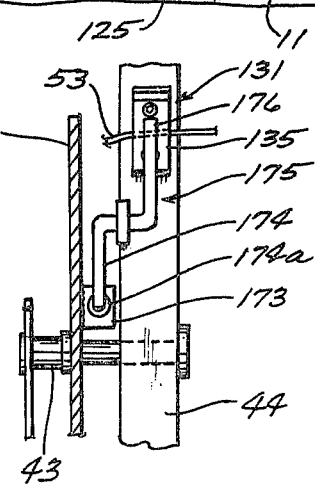
FIG. 18 is a fragmentary section view taken on line 18—18 of FIG. 16.

Referring to FIG. 13, as the piston rod 154 is extended, the position control arm 170 is rotated clockwise about the axle 43 from its normal position. Initially such piston movement is lost motion and does not cause movement of the twine dispensing arm so that a substantial amount of twine is wrapped about the first end of the bale. At the end of its lost motion, the arm 170 engages an abutment 171 on the upper surface 45 of the control wheel 42 to produce like movement of the control wheel 42 and the twine dispensing arm 41. During such movement the control wheel 42 is rotated until a cam 172 on the wheel 42 engages the lever arm 133 and pivots it back into a neutral position. Also, as best shown in FIG. 18, an abutment 173 on the lower surface of the control wheel 42 engages a coil spring 174a fixed on one end 174 of a lever arm 175 pivotally connected to the strut 44. As a result the arm 175 is pivoted until another end 176 of the arm 175 presses against the tension assembly 131 to increase the tension on the twine 53. Increased twine tension is needed to increase the counterclockwise force exerted on the upper end of the lever arm 133 and thereby counteract a clockwise force exerted on the lower end of the lever 133 by a spring 182 that is connected to the lever arm 133 and the control wheel 42 and is stretched as the wheel rotates clockwise. Without increased tension on the twine 53, the spring 182 would cause the lever arm 133 to pivot clockwise and actuate the valve 148 to the retract position 161.

During the clockwise motion of the wheel 42, the outer end of the twine dispensing arm 41 first travels on an arc along the lower side of the bale and is then returned to the locking mechanism 60. This movement of the dispensing arm 41 together with the rotation of the formed bale by the conveyor 19 results in a spiral wrapping of twine 53 along the length of the bale, as indicated by FIG. 12. As the twine dispensing arm 41 approaches the end of the bale, the twine 53 being dispensed from the arm 41 engages a twine guide bar 183 (FIG. 9) that leads to a twine cutter assembly 184. The cutter assembly 184 includes a twine cutter 185 and an angle shaped cutter gate 186 that is pinned to the main frame sidewall 13. The gate 186 is connected to a bracket 187 mounted on the end 108 of the actuating member 106 by a line 188 formed of a series connected cable 189 and a spring 190, and is opened and closed in response to movement of the member 106.

Figure 15:
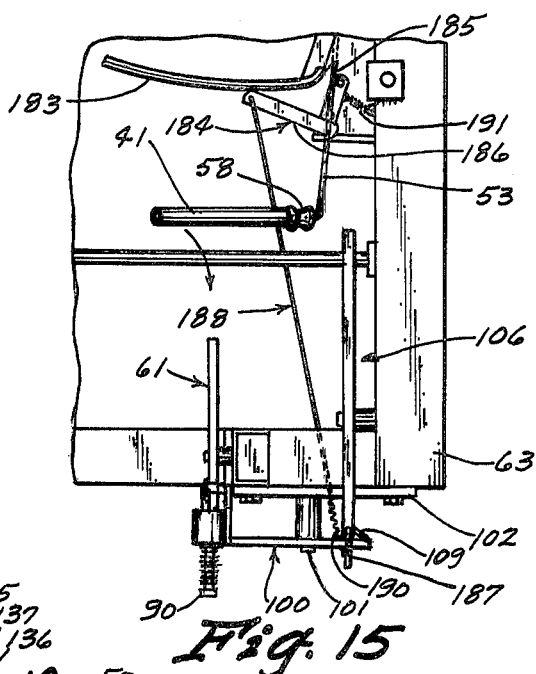
FIG. 15 shows the twine being cut by a twine cutter at the end of a bale wrapping operation.

During bale wrapping, the end of the member 106 is in an up position to place tension on the line 188 and thereby move the gate 186 to a closed position, shown in FIG. 9. Thus, when the twine 53 approaches the cutter assembly 184, the gate 186 prevents the twine 53 from reaching the cutter 185 so that wrapping of the twine 53 about a second end of the bale adjacent the cutter assembly is permitted. Such wrapping continues until the actuating member 106 is released from contact with the actuating member 105. This occurs only when the baler operator opens the rear of the baler, as shown in FIG. 14, to unload the wrapped bale, so that the operator has complete control over how much twine is wrapped about the second end of the bale adjacent the cutter assembly 184. As the bale is unloaded, tension on the line 188 is relaxed and a spring 191 pulls the cutter gate clockwise to open it and permit the twine 53 to engage the cutter 185, as shown in FIG. 15, just prior to unloading of the bale.

Figure 16:
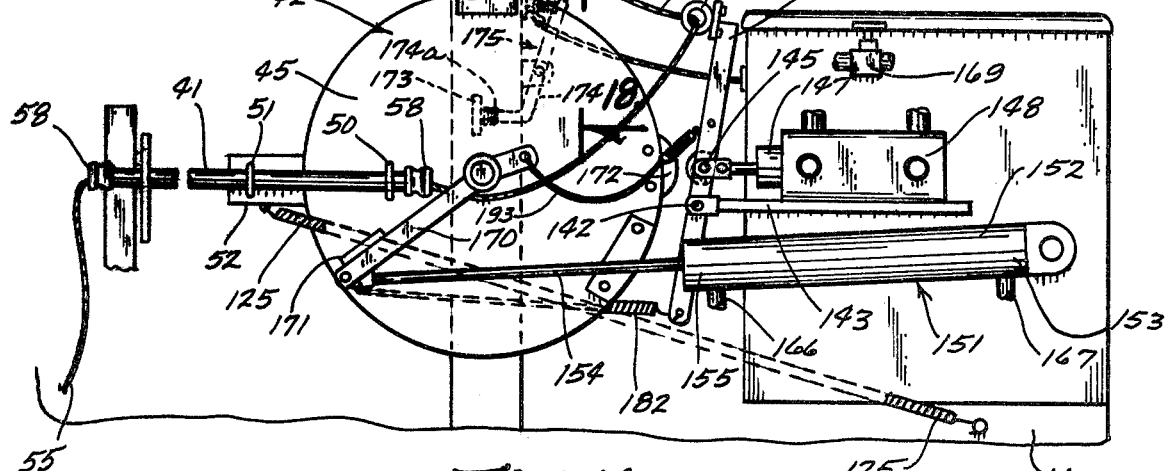
FIG. 16 is similar to FIG. 13 but showing the dispensing arm fully returned to the locking mechanism.

Immediately prior to cutting of the twine 53, the piston rod 154 of the motor is fully extended because the tension on the twine 53 maintains the valve 148 in the neutral position 159. However, immediately after twine cutting, tension on the twine 53 is released, as shown in FIG. 16, and the spring 182 that is connected to the end of the lever arm 133 and the control wheel 42 then causes clockwise pivoting of the valve lever arm 133 to actuate the valve 148 to the retract position 161. As a result, the piston rod 154 is moved back into the cylinder 152, and concurrently, the control arm 170 is pivoted counterclockwise to its normal position. As the rod 154 reaches a fully homed position the lever arm 133 is rotated counterclockwise by a line 193 connected to the arm 133 and an inner end of the control arm 170 to counteract the force of the spring 182. The lever arm 133 is thus again returned to the neutral position 159 to contact cam 172 on the control wheel 42, and the entire bale wrapping assembly is completely reset to begin another bale wrapping operation.

Thus, the present invention provides a bale wrapping operation that is automatically actuated at the completion of a bale forming operation and is thereupon continuously carried on until the bale is completely wrapped.

Although the invention has been described with respect to a preferred embodiment thereof, it is to be understood that it is not to be so limited since changes and modifications can be made therein which are within the full intended scope of this invention as defined by the appended claims.

I claim:

1. In a machine for forming a round bale of windrowed material having a mobile main frame, bale forming means mounted on the frame, conveyor means for feeding said material to said bale forming means and for rotating said material during and subsequent to bale formation, a supply of wrapping line having a free end, and a pick-up mechanism for supplying said material to said conveyor means, the improvement of an automatic bale wrapping assembly comprising:

(a) an elongated wrapping line dispensing arm having an outer end from which said free end of said wrapping line is extended, (b) means on said frame for movably supporting said dispensing arm, (c) locking means for releasably securing said dispensing arm in a rest position during bale formation, (d) coacting means on said bale forming means and said frame for automatically actuating said locking means to release said dispensing arm when a bale being formed by said machine reaches a predetermined diameter, (e) means for moving said dispensing arm in one direction, upon release thereof by said locking means, from said standby position to a bale wrapping position wherein said free end of said wrapping line is engaged by said conveyor means for travel under the lower side and about one end of said formed bale as said bale is rotated by said conveyor means, (f) means for moving said dispensing arm in an opposite direction to move said one end of said dispensing arm along the length of said bale and to return said arm to said rest position, said means comprising:

(1) a hydraulic motor mounted on said main frame and including:
(i) a cylinder,
(ii) a piston disposed within the cylinder, and
(iii) a piston rod having one end attached to said piston and an opposite end that protrudes from one end of the cylinder, (2) means for actuating said motor as said wrapping line is wrapped about said one end of said bale to extend said motor piston, and (g) means for cutting said line subsequent to wrapping of said line about said bale.

2. In a machine according to claim 1, wherein said locking mechanism comprises:

(a) a rotatable dispensing arm holder in which said outer end of the dispensing arm is secured when said dispensing arm is in said rest position;

(b) a latch release mechanism engaging said holder for preventing rotation of said holder during bale formation, and being actuable by said coacting means to disengage said holder.

3. In a machine according to claim 2, wherein:

(a) said dispensing arm holder has a notch at one end; and (b) said latch release mechanism includes:
(1) a pivotable release lever having a roller that is disposed in the notch of said holder, and
(2) a pawl that engages said release lever and is actuated by said coacting means to move the roller of said lever out of the notch of said holder.

4. In a machine according to claim 3, wherein:

(a) said coacting means includes:
(1) a first actuating member that is pivotally attached to said main frame,
(2) a second actuating member that is secured to said bale forming means to move in correspondence therewith into engagement with said first actuating member as a bale being formed by said machine reaches a predetermined diameter.

5. In a machine according to claim 1, wherein:

(a) said means for supporting said dispensing arm includes,
(1) a disc shaped control wheel that is journaled on an axle mounted on said main frame,
(2) bracket means on said control wheel and said support plate for securing said dispensing arm on said wheel.

6. In a machine according to claim 1, wherein said assembly further includes:

(1) a pivotable cutter gate that is positioned on one side of said cutter means to prevent cutting of said twine until said formed bale is ejected from said machine.

* * * * *